Aug. 15, 1967

C. F. ALBAN ET AL  3,336,119
ELEMENT FOR SENSING AND CONTROLLING
HUMIDITY AND TEMPERATURE CHANGES

Filed Nov. 4, 1964

INVENTORS
*CLARENCE F. ALBAN*
*CHARLES C. PERRY*

BY *Olsen and Stephenson*
ATTORNEYS

United States Patent Office 3,336,119
Patented Aug. 15, 1967

3,336,119
ELEMENT FOR SENSING AND CONTROLLING HUMIDITY AND TEMPERATURE CHANGES
Clarence F. Alban, Detroit, and Charles C. Perry, Ann Arbor, Mich., assignors to W. M. Chace Company, Detroit, Mich., a corporation of Delaware
Filed Nov. 4, 1964, Ser. No. 408,834
11 Claims. (Cl. 29—195)

This invention relates generally to elements for sensing and controlling humidity and temperature changes, and more particularly to a laminated element which is responsive to both humidity and temperature changes in the ambient environment and is capable of controlling ambient temperature and/or humidity so as to maintain these conditions compatible with each other and therefore maintain an "effective temperature" consistent with human comfort.

It is well known that the comfort of a human being in a room is affected not only by ambient temperature but by ambient humidity conditions. As the humidity rises, a lower temperature is required in order for a human being to be comfortable. The American Society of Heating, Refrigeration and Air Conditioning Engineers (ASHRAE) has, as a result of tests, determined that certain combined effects of dry bulb temperature and relative humidity are necessary to maintain a certain desired degree of human comfort. The degrees of comfort are referred to hereinafter as "effective temperatures" although they do not represent a temperature in the thermodynamic sense. For most humans in the United States, the ASHRAE tests show that the comfort range in summer is in the approximate range of 65°–70° (effective temperature) and in winter the approximate range is 68°–73° (effective temperature). It is an object of this invention, therefore, to provide a single sensing and control element which is responsive to both temperature and humidity changes, can be adapted as a control for both heating and cooling equipment or for humidity control equipment, is proportioned so that its responses to unit temperature and humidity changes are relatively proportioned so that the element can be utilized to maintain a predetermined effective temperature range, and is proportioned so that maximum responses to effective temperature changes are obtained.

A further object of this invention is to provide a control and indicating element of the above type which is relatively easy to manufacture, is compact and versatile in application, and is constructed so that it is capable of controlling the flow of electricity to heating, cooling, humidifying and dehumidifying equipment.

Further objects, features and advantages of this invention will become apparent from a consideration of the following description, the appended claims, and the accompanying drawing in which:

Figure 1:
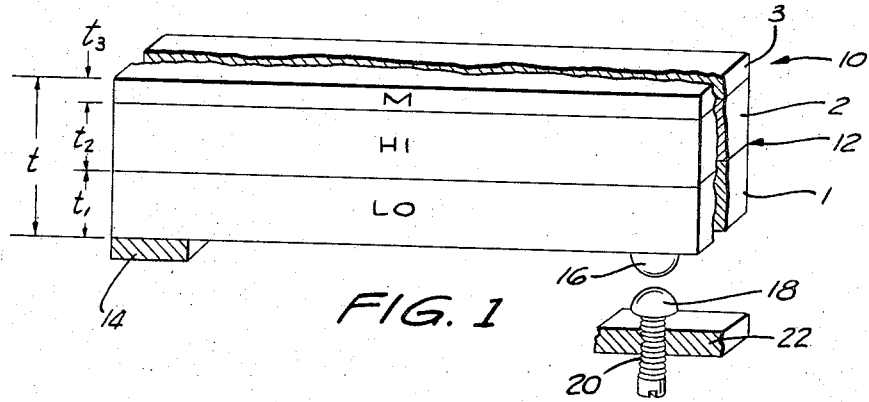
FIGURE 1 is a somewhat diagrammatic view illustrating one application of the element of this invention adapted principally for controlling cooling equipment with the thickness of element being exaggerated relative to length for ease of illustration and to facilitate identification of component layers.

With reference to the drawing, the element of this invention, indicated generally at 10, is illustrated in FIG. 1 in an installation adapted principally for controlling cooling equipment, such as air-conditioning apparatus, or dehumidifying equipment. The element 10 consists of a multilayer metal unit 12, illustrated as a bimetal strip having a pair of layers or laminations 1 and 2, but which can include three or more layers of metal or other thermally responsive material, and a strip or lamination 3 of an elastic hygroscopic material which changes dimensions in response to changes in humidity conditions. The laminations 1 and 2 are bonded together in any suitable manner, usually by welding and rolling, and the lamination 3 is subsequently secured to the outer surface of lamination 2, for example, by a suitable adhesive bonding material. The laminations 1, 2 and 3 are disposed in surface-to-surface contact and secured together substantially over the entire area of their contiguous surfaces so that the laminated element 10 acts as an integral whole.

The materials from which the laminations 1 and 2 are formed are selected so that they have different coefficients of thermal expansion. The lamination 1 has a lower coefficient of thermal expansion than lamination 2, and consequently, lamination 1 is labeled "lo" and lamination 2 is labeled "hi" in the drawing. In a preferred embodiment of the invention, an alloy of 36% nickel and 64% iron is used to form the lamination 1 and the lamination 2 is formed from either an alloy composed of 22% nickel, 3% chromium, 75% iron, or 72% manganese, 18% copper and 10% nickel. The most suitable material for the moisture sensing lamina 3, which is therefore labeled "M" in the drawing, is a polyamide such as nylon, and the specific type which is preferred is Capran, a flexible thermoplastic film or sheet made by Allied Chemicals Corporation, General Chemical Division, Chicago, Ill., U.S.A. Capran is made from nylon-6 resin, specifically a polymer of ε-caprolactam.

Figure 5:
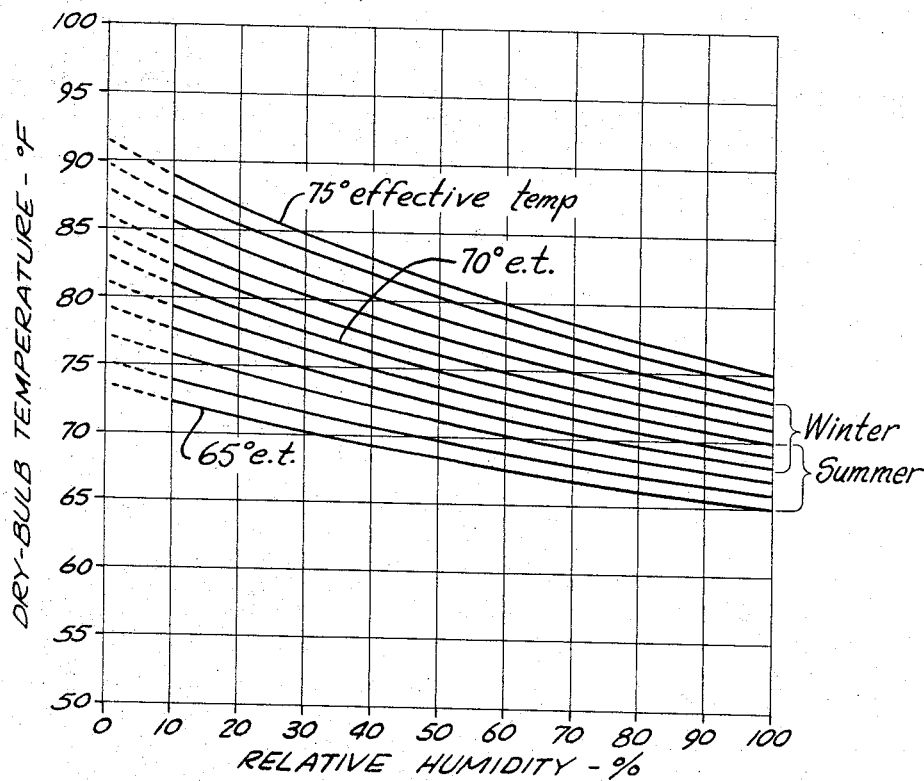
FIGURE 5 is a graph showing the relationship of dry bulb temperature and relative humidity required to maintain certain effective temperatures.

It is well known that human comfort in a room is dependent on both ambient temperature and ambient humidity conditions. Starting with any combination of comfortable humidity and temperature conditions, as the relative humidity in a room rises, human comfort decreases unless there is a corresponding decrease in the ambient temperature. Likewise, starting with the same conditions, as the relative humidity in a room decreases, human comfort will decrease unless there is a corresponding increase in the temperature. This is best illustrated in FIG. 5 which shows, based on the ASHRAE tests, the relationships of dry bulb temperature and relative humidity which must be maintained in order to maintain certain effective temperatures which are represented by lines on the graph. The effective temperature necessary for human comfort may vary from one individual to the next, but in most cases, optimum individual comfort in the United States in the summertime is obtained by maintaining an effective temperature in the range of 65°–70°. In the wintertime in the United States, this range is 68°–73°. FIG. 5 illustrates, for example, that to have an effective temperature of 70° when the relative humidity is 90%, the dry bulb room temperature must be 71° F. But to maintain the same effective temperature when the relative humidity is 10%, the dry bulb room temperature must be 81° F. The control element of this invention since it includes the thermally responsive strips 1 and 2 and the humidity responsive strip 3 is capable of providing for a temperature which is consistent with room humidity conditions or providing for room humidity conditions which are consistent with temperature conditions, although with the present home and office room conditioning equipment which is in use the former, namely, control of room temperature is most feasible.

The element 10 is illustrated in FIG. 1 fixed at one end to a fixed support 14 for lateral movement at the opposite end in response to changes in ambient temperature and humidity conditions. A first or movable contact 16 is fixed to the lamina 1 at the opposite end of the element 10 and a second or fixed contact 18 is provided on a screw 20 which is adjustably mounted on a fixed support 22. The contacts 16 and 18 are connected, by means of suitable conductors (not shown), in a control circuit for room cooling apparatus such as air-conditioning equipment (not shown) or room dehumidifying apparatus. The circuit, which is well known and is therefore not illustrated herein, is such that when the contacts 16 and 18 are engaged, the cooling apparatus operates to cool the ambient environment which is under the control of the element 10, and when the contacts 16 and 18 are spaced, the cooling effect of the cooling equipment on the room is reduced or discontinued. It is to be understood, however, that the element 10 is also usable without the contacts 16 and 18 in an environment in which the magnitude of movement of the element 10 is utilized to obtain a continuous response, as contrasted with an "on-off" response inherent in the FIG. 1 environment, which has a predetermined relation to the magnitude of the movement of element 10.

As the temperature in the ambient environment in which the element 10 is located increases, the strip 2 expands at a faster rate than the strip 1 so that the unit 12 is deflected in a direction to move the contact 16 toward the contact 18. As the relative humidity in the ambient environment for the element 10 increases, the hygroscopic strip 3 expands causing deflection of the element 10 in a direction to move the contact 16 toward the contact 18. Consequently, in the event of either a humidity or temperature rise in the ambient environment, the contact 16 is moved into engagement with contact 18 to provide for operation of the cooling equipment to lower the temperature in the ambient environment and thereby restore the comfort of the humans therein.

As shown in FIG. 5, when relative humidity rises, a lower dry bulb temperature is required for comfort. In such case, expansion of the strip 3 causes the contacts 16 and 18 to close, causing operation of the cooling equipment and lowering of the dry bulb temperature until the thermally responsive unit 12 has been cooled sufficiently to move the contact 16 out of engagement with the contact 18. It can thus be seen that the element 10 illustrated in FIG. 1 is capable of use with conventional cooling equipment to maintain humidity and temperature conditions in an ambient environment which are compatible with human comfort.

Figure 2:
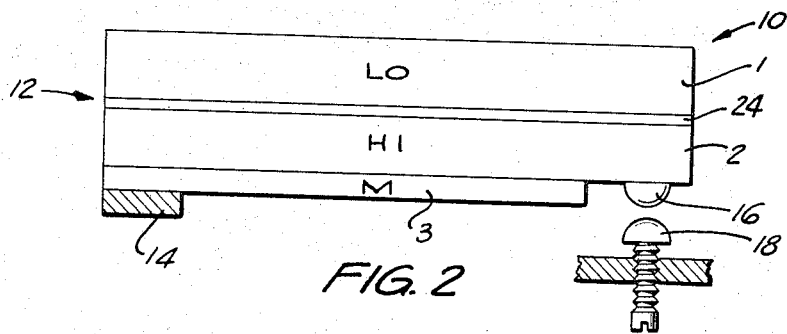
FIGURE 2 is a view like FIG. 1 of another application of the element of this invention adapted principally for controlling room heating equipment.

In FIG. 2, the unit 10 is shown adapted for controlling heating equipment such as a home furnace or humidifying equipment. The length of the hygroscopic strip 3 in the illustrated embodiment of the invention is reduced so that the movable contact 16 can be attached to the strip 2. The contacts 16 and 18 are connected in a circuit, in a well known manner, with the furnace equipment so that the ambient environment in which the element 10 is located is heated when the contacts 16 and 18 are engaged and is allowed to cool off when the contacts 16 and 18 are spaced. It is to be understood, however, that the installation of the element 10 shown in FIG. 1 is also usable for control of room heating equipment by merely providing for operation of the heating equipment when the contacts 16 and 18 are spaced. Likewise, the installation of the element 10 shown in FIG. 2 is usable for controlling room cooling equipment by merely providing for operation of the cooling equipment when the contacts 16 and 18 are spaced. The more usual arrangement is to provide for operation of the equipment which cools or heats the room in response to closing of the contacts 16 and 18. In some cases, such as illustrated in FIG. 2, a layer 24 of a good electrical current conducting material such as nickel or copper, can be interposed between the strips 1 and 2 so as to improve the electrical conducting characteristic of the element 10 in its environment in a control circuit.

In the operation of the element 10 in the installation shown in FIG. 2, as the room temperature decreases, the strip 2 will contract faster than the strip 1 so as to move the contact 16 toward the contact 18. When the room temperature is decreased sufficiently, the contacts 16 and 18 are engaged to provide for operation of the room heating equipment. However, if the relative humidity in the room has increased during this temperature decrease, the hygroscopic strip 3 will expand and therefore tend to deflect the element 10 in a direction to move the contact 16 away from the contact 18. Consequently, during a decrease in room temperature, if the relative humidity of the room is rising, the contacts 16 and 18 will be closed at a lower temperature. Conversely, if the relative humidity of the room is decreasing during a decrease in temperature, these conditions will have a cumulative effect on the element 10 to provide for engagement of the contacts 16 and 18 at a higher dry bulb room temperature.

Figure 3:
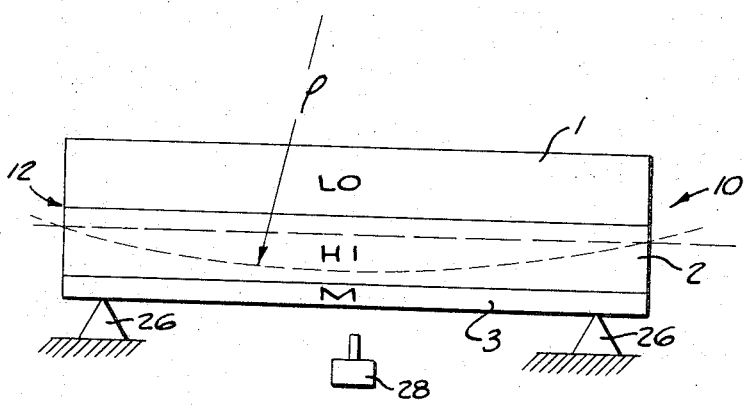
FIGURE 3 is a diagrammatic view similar to FIGS. 1 and 2 of still another application of the element of this invention arranged for actuating a control or indicating element.

In FIG. 3, the element 10 is shown in an installation in which it is not cantilever mounted but is beam mounted on fixed supports 26 which are horizontally spaced and disposed adjacent opposite ends of the element 10. As the temperature rises, and as the relative humidity goes up, the element 10 will expand so as to move the central portion thereof downwardly toward an actuating or signal element 28, such as a miniature switch. The switch 28 can in turn be connected in any suitable control circuit for any humidifying, de-humidifying, heating or cooling equipment. In response to engagement of the element 10 with the actuator 28, the ambient environment in which the element 10 is located will be de-humidified and/or cooled, and in response to release of the actuator 28 by the element 10, the ambient environment will be heated and/or humidified. In any event, the temperature responsive unit 12 and the moisture responsive lamina 3 cooperate to maintain temperature and humidity conditions consistent with human comfort.

By properly proportioning the component thicknesses of the laminae 1, 2 and 3, the element 10 will actuate the heating, cooling, humidifying, or de-humidifying equipment controlled thereby to keep the ambient environment in which the element 10 is located such that the dry bulb temperature and relative humidity therein will follow the average slope of the effective temperature curves shown in FIG. 5. In other words, the element 10 will respond only to changes in effective temperature, so that it will control or indicate degrees of comfort. In order to achieve this result, the relative thicknesses of the strips 1, 2 and 3 are proportioned as follows:

First assume that the element consists of only the strips 1, 2 and 3, since any additional strips such as the copper or nickel strips 24 will have little effect on the relative thicknesses of the strips 1, 2 and 3, and the same method of analysis and criteria for proportioning the components applies. The general expression for the change in curvature of any three-layered element in which one or more of the component layers is subject to dimensional changes as a result of both temperature and humidity changes is as follows:

$$\frac{1}{\rho} = 6 \left\{ \frac{[\Delta T(\alpha_2 - \alpha_1) + \Delta H(\beta_2 - \beta_1)]Q + [\Delta T(\alpha_3 - \alpha_2) + \Delta H(\beta_3 - \beta_2)]R}{t[Z + 3(A+B)Q + 3(1-A)R]} \right\}$$

(1)

where:

$Q = DA[B(A+B) + GC(B+1)]$
$R = GC[B(1-A) + DA(B+1)]$
$Z = (DA^3 + B^3 + GC^3)(DA + B + GC)$ $\rho$ = radius of curvature of said element
$\Delta H$ = change in humidity
$t$ = total thickness of said element
$\beta$ = coefficient of linear hygroscopic expansion
$\alpha$ = coefficient of linear thermal expansion
$A = t_1/t$
$B = t_2/t$
$C = t_3/t$
$D = E_1/E_2$
$E$ = modulus of elasticity
$G = E_3/E_2$
$\Delta T$ = change in temperature Numerical subscripts refer to particular laminations.

In the element 10, $\beta_1 = \beta_2 = 0$, since laminations 1 and 2 are non-hygroscopic. Equation 1 thus reduces to:

$$\frac{1}{\rho} = \frac{6}{t}\left(\frac{\Delta T[(\alpha_2-\alpha_1)Q+(\alpha_3-\alpha_2)R]+\Delta H\beta_3 R}{Z+3(A+B)Q+3(1-A)R}\right) \quad (2)$$

Assume no change in relative humidity, so that $\Delta H = 0$ in Equation 2. The change in curvature in element 10 caused only by a change in temperature is then expressed as follows:

$$\left(\frac{1}{\rho}\right)_{\Delta T} = \frac{6\Delta T}{t}\left[\frac{(\alpha_2+\alpha_1)Q+(\alpha_3-\alpha_2)R}{Z+3(A+B)Q+3(1-A)R}\right] \quad (3)$$

The change in curvature in element 10 caused only by a change in relative humidity, so that $\Delta T = 0$ in Equation 2 is as follows:

$$\left(\frac{1}{\rho}\right)_{\Delta H} = \frac{6\Delta H}{t}\left[\frac{\beta_3 R}{Z+3(A+B)Q+3(1-A)R}\right] \quad (4)$$

From FIG. 5 it is seen that the average slope of the effective temperature curves plotted thereon, in the portions of the curves between 30 and 70% relative humidity, which is the usual room range, is about 1 to 8–12 or about 1 to 10. For extremely high relative humidities, the slope is about 1 to 16, for extremely low relative humidities, the slope is about 1 to 4. Thus, designating the ratio of change of curvature of element 10 per unit change in temperature to change in curvature per unit change in relative humidity as N, it is seen that N can range from 16 to 4 under extreme humidity conditions, is usually in the range of 8 to 12 and is about 10.

Also, N can be expressed, by comparing Equations 3 and 4, as follows:

$$\frac{\left(\frac{1}{\rho}\right)_{\Delta T}}{\Delta T} \Big/ \frac{\left(\frac{1}{\rho}\right)_{\Delta H}}{\Delta H} = N \quad (5)$$

Substituting Equations 3 and 4 in Equation 5 and introducing N in Equation 2, it is found that:

$$\frac{1}{\rho} = \frac{6R\beta_3}{t}\left(\frac{N\Delta T+\Delta H}{Z+3R\left[(A+B)\frac{N\beta_3-(\alpha_3-\alpha_2)}{\alpha_2-\alpha_1}+1-A\right]}\right) \quad (6)$$

Equation 6 is thus the general deflection equation for the element 10 proportioned for maintaining an effective temperature. A value of N is selected to meet the particular circumstances, the materials for the laminations 1, 2 and 3 are selected and Equation 6 is utilized to compute $t_1$, $t_2$, and $t_3$.

It is also desirable, although not necessary in all cases, to select the thicknesses $t_1$, $t_2$ and $t_3$ so that a maximum change in curvature of element 10 is obtained in response to unit changes of "effective temperature," namely, changes in either dry bulb temperature or relative humidity or changes in both, the change in curvature of element 10 in response to a unit temperature change bearing a pre-established ratio relationship to the change in curvature in response to a unit humidity change. This improves the accuracy of element 10. This determination of thicknesses is accomplished as follows:

Since $$A+B+C=1 \text{ or } C=1-(A+B)$$

Solving then for A in terms of B, it is found that:

$$A = \frac{-S \pm \sqrt{S^2+4UV}}{2U} \quad (7)$$

in which $$S = DB^2 + DG(1-B^2)\left(1-\frac{N\beta_3-(\alpha_3-\alpha_2)}{\alpha_2-\alpha_1}\right) - GB\left(\frac{N\beta_3-(\alpha_3-\alpha_2)}{\alpha_2-\alpha_1}\right)$$

$$U = DB - DG(B+1)\left(1-\frac{N\beta_3-(\alpha_3-\alpha_2)}{\alpha_2-\alpha_1}\right) - GB\left(\frac{N\beta_3-(\alpha_3-\alpha_2)}{\alpha_2-\alpha_1}\right)$$

$$V = GB(1-B)\left(\frac{N\beta_3-(\alpha_3-\alpha_2)}{\alpha_2-\alpha_1}\right)$$

Equation 7 is utilized to determine the relative thickness A, and thus C, once the properties of laminations 1, 2 and 3 are specified and a value of B is selected. In order to select B so as to yield maximum sensitivity of element 10 to a change in effective temperature, C is first eliminated from R and Z in Equation 6 by substituting $C = 1-(A+B)$. Equation 7 is then substituted in Equation 6 to eliminate A, and obtain an expression for the change in curvature as a function of only B and the properties of the component materials. Symbolically, such an equation appears as:

$$\frac{1}{\rho} = f(B,D,G,\alpha_1,\alpha_2,\alpha_3,\beta_3) \quad (8)$$

where "$f$" means "a function of."

Equation 8 is differentiated with respect to B and the result set equal to zero to solve for the value of B producing maximum sensitivity, hereinafter referred to as B*. Thus:

$$B^* = f(D,G,\alpha_1,\alpha_2,\alpha_3,\beta_3)$$

Figure 4:
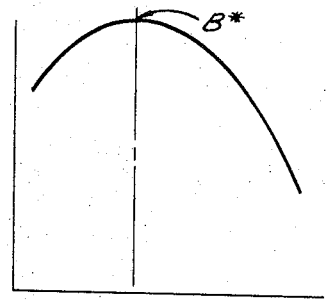
FIGURE 4 is a graph which is plotted to obtain particular conditions in one embodiment of the laminated element of this invention.

Such a differentiation yields an equation which, because of its form and degree, cannot be solved explicitly for B*, and it is necessary to instead solve numerically by substituting specific values for D, G, $\alpha_1$, $\alpha_2$, $\alpha_3$, and $\beta_3$ and selected values of B and solve for specific changes in curvature. The numerical results are then plotted, as shown in FIG. 4, to determine the value of B corresponding to maximum sensitivity.

From the above description it is seen that this invention provides a comfort control thermostat 10 which is responsive to both temperature and humidity changes, and is therefore effective to maintain dry bulb room temperatures which are consistent with humidity conditions. This provides, in effect, for response to and control of "effective temperatures." It is also within the scope of this invention, however, to utilize element 10 to control temperature and/or humidity conditions so as to maintain a predetermined temperature-humidity relationship in an environment which is not necessarily related to comfort.

It will be understood that the comfort control thermostat which is herein disclosed and described is presented for purposes of explanation and illustration and is not intended to indicate limits of the invention, the scope of which is defined by the following claims.

What is claimed is:

1. A laminated element for sensing changes in ambient humidity and temperature conditions comprising a thermally responsive multilayer metal unit having at least two layers of metal having different coefficients of thermal expansion and a side surface, and a self-sustaining layer of an elastic hygroscopic material which changes dimensions in response to changes in humidity conditions, said layer having a side surface arranged in surface-to-surface contact with and secured over substantially its entire area to said side surface of said metal unit so that said laminated element acts as an integral whole.

2. The element according to claim 1 in which said layer of hygroscopic material is a polyamide.

3. A combination humidity and temperature responsive device comprising a thermally responsive multilayer metal unit having at least two layers of metal having different coefficients of thermal expansion and a side surface, and a self-sustaining layer of an elastic hygroscopic material which changes dimensions in response to changes in humidity conditions, said layer having a side surface intimately secured throughout its extent to said side surface of said metal unit, said layers being proportioned as to the thicknesses thereof such that the ratio of the change in curvature thereof caused by each degree change in ambient temperature to the change in curvature caused by each degree change in ambient relative humidity is a predetermined ratio.

4. The device according to claim 3 in which said predetermined ratio is in the range of 4 to 16.

5. The device according to claim 3 in which said predetermined ratio is about 10.

6. A control element comprising a first metal strip having a lower coefficient of thermal expansion, said strips being secured in side-by-side relation so that expansion and contraction of either strip causes movement of the other strip, and a strip of an elastic hygroscopic material which changes dimensions in response to changes in humidity conditions secured to said first metal strip so that expansion and contraction thereof causes movement of said metal strips.

7. A laminated control element comprising a first metal strip having a given coefficient of thermal expansion and a pair of opposite sides, a second metal strip having a lower coefficient of thermal expansion, said second strip being arranged in surface-to-surface contact with one side of said first strip and being secured thereto over substantially the entire area of the contiguous surfaces thereof so that said strips act as an integral whole, and a strip of a hygroscopic plastic material which changes dimensions in response to changes in humidity conditions, said plastic strip being arranged in surface-to-surface contact with the opposite side of said first strip and being secured thereto over substantially the entire area of the contiguous surfaces thereof so that said element acts as an integral whole and so that expansion and contraction of one of said strips causes movement of all of said strips.

8. A laminated element for sensing changes in ambient humidity and temperature conditions comprising at least three laminations (hereinafter referred to as laminations 1, 2 and 3) arranged in surface-to-surface contact and secured together over the entire area of their contiguous surfaces so that the laminated element acts as an integral whole, laminations 1 and 2 being formed of thermally responsive non-hygroscopic materials having different coefficients of thermal expansion, lamination 3 being formed of a self-sustaining hygroscopic material which changes dimensions in response to changes in humidity conditions to thereby change the curvature of said element, lamination 2 having a higher coefficient of thermal expansion and lamination 1 and being positioned in said element between lamination 1 and lamination 3 so that increased temperature and humidity in the environment cause curvature of said element in the same direction, the thicknesses of said three laminations being relatively proportioned such that the ratio of the change in curvature of said element resulting from a unit rise in ambient temperature to the change of curvature of said element resulting from a unit rise in ambient humidity is a predetermined ratio.

9. The element according to claim 8 in which the thicknesses of said three laminations are also such that while maintaining said ratio substantially maximum changes in curvature of said element are obtained in response to unit changes in ambient temperature and humidity conditions.

10. The element according to claim 8 in which said thicknesses are proportioned substantially according to the following expression:

$$\frac{1}{\rho} = \frac{6R\beta_3}{t}\left(\frac{N\Delta T + \Delta H}{Z + 3R(A+B)\left[\left(\frac{N\beta_3 - (\alpha_3 - \alpha_2)}{(\alpha_2 - \alpha_1)}\right) + 1 - A\right]}\right)$$

$\rho$ = radius of curvature of said element
$R = GC[B(1-A) + DA(B+1)]$
$\beta$ = coefficient of linear hygroscopic expansion
$t$ = total thickness of said element
$N$ = said ratio
$\Delta T$ = change in temperature
$\Delta H$ = change in humidity
$Z = (DA^3 + B^3 + GC^3)(DA + B + GC)$
$A = t_1/t$
$B = t_2/t$
$C = t_3/t$
$D = E_1/E_2$
$E$ = modulus of elasticity
$G = E_3/E_2$
$\alpha$ = coefficient of linear thermal expansion numeral subscripts refer to correspondingly numbered laminations.

11. The element according to claim 10 in which N is in the range of 4 to 16 and $t_1$, $t_2$, and $t_3$ are further proportioned to obtain substantially maximum change in curvature of said element in response to changes in ambient temperature and humidity conditions.

References Cited

UNITED STATES PATENTS

| | | | |
|---|---|---|---|
| 2,863,025 | 12/1958 | Flanagan | 29—195 |
| 2,962,806 | 12/1960 | Stumbock | 29—195.5 |
| 3,102,793 | 9/1963 | Alban | 29—195.5 |
| 3,307,001 | 2/1967 | Alban | 29—195.5 |

DAVID L. RECK, *Primary Examiner.*

R. O. DEAN, *Assistant Examiner.*